N. A. PALMGREN.
NUT LOCK.
APPLICATION FILED DEC. 1, 1921.
1,420,737.
Patented June 27, 1922.
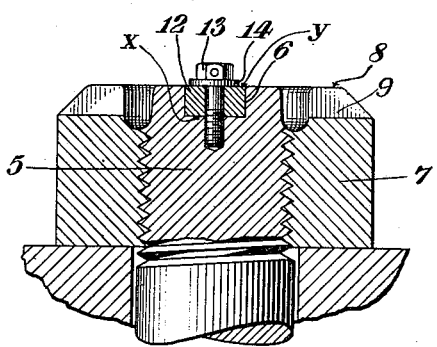
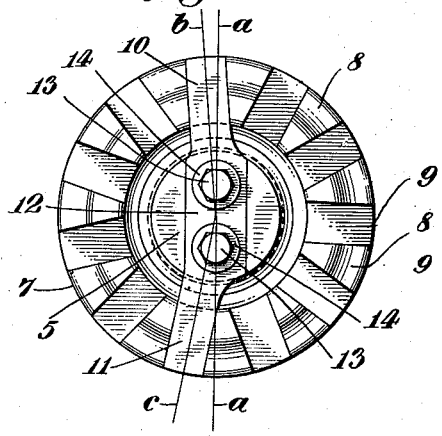
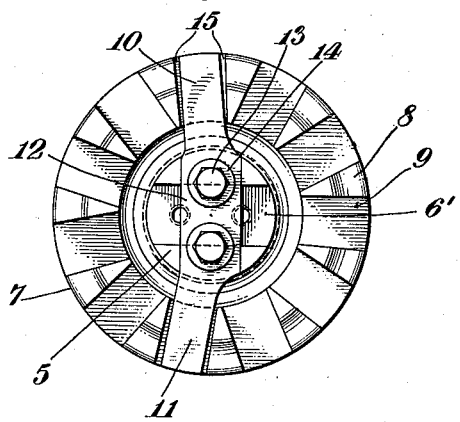
Inventor
N. A. Palmgren.
By his Attorneys
Rogers, Kennedy Campbell

UNITED STATES PATENT OFFICE.

NILS ARVID PALMGREN, OF GOTTENBORG, SWEDEN, ASSIGNOR TO AKTIEBOLAGET SVENSKA KULLAGERFABRIKEN, A CORPORATION OF SWEDEN.

NUT LOCK.

1,420,737. Specification of Letters Patent. Patented June 27, 1922.

Application filed December 1, 1921. Serial No. 519,057.

*To all whom it may concern:*

Be it known that I, NILS ARVID PALMGREN, a subject of the King of Sweden, residing at Gottenborg, in the Kingdom of Sweden, have invented certain new and useful Improvements in Nut Locks, of which the following is a specification, reference being had therein to the accompanying drawing.

This invention relates to an improved nut locking device and has for an object to provide a strong and efficient construction and one wherein the relative locking positions between the nut and the bolt reside but short angular distances apart.

In the drawing accompanying this specification a practicable embodiment of the invention is shown by way of illustration in which drawings—

Figure 1 is an axial section of a nut and bolt provided with my improvement, the locking member being shown in cross section.

Fig. 2 is a plan view of the mechanism represented in Fig. 1, and

Fig. 3 is a detail of a modification for increasing the number of locking positions.

In describing my invention I will first have reference to the simpler form illustrated herein. In Figs. 1 and 2, 5 represents the screw threaded end of a bolt having at its outer portion a transverse slot 6 for receiving the locking member presently to be described. Screwed into place upon the bolt is a nut 7 of modified castellated form having a plurality of elevations 8 set off by channels or transverse notches 9. The sides of the elevations define the notches and present engaging faces for the locking fingers 10 and 11 of the locking member 12, the body portion of which is shown located in the slot 6 mentioned above. The locking member is held in position in some convenient manner, as, for instance, by a suitable number of screws 13, which are preferably prevented from displacement by means of lock washers, 14.

The number of notches in the outer face of the nut is dependent in a degree on the size of the nut and upon the character of material of which it and the bolt are made as well as upon the object upon which it is contemplated using it. The greater the rigidity of all these elements named, the smaller is the possible amount of angular movement upon the bolt. In the present illustration the count of the slots or notches is an odd number and also a prime number, such a number being selected for a definite purpose which will be explained later. In the present illustration eleven notches are shown. The locking finger 10 is shown offset from the body portion of the member by which it is carried; the line $a$ represents the center line of the body portion and the line $b$ the center line of this locking member. The angle between these two lines is one-eighth of the angular distance between two adjacent slots in the nut. If the nut happens to be screwed down to its illustrated position, the locking member may be dropped into the slot 6 and into that notch 9 which it is now shown as occupying. Should, however, the nut be turned down still further this locking finger will then find lodgment in the same notch by turning the body portion upside down, that is, the face $x$ which is now lowermost will be placed up and the other face $y$ in the position now occupied by the face $x$. This brings the finger 10 further toward the right. If, however, neither of these positions brings a slot into register with these two positions of the locking finger, the locking member is tried at a position of angular advance of 180° and both the faces $x$ and $y$ presented at the top. This gives four combinations, and unless the position in which the nut has to be located must be very accurately defined it is generally possible to force the nut the small amount necessary to permit the locking finger, in one of its four possible positions, to register in one or the other of these notches. The number of locking positions corresponding to the turning angle equal to the angle between two adjacent notches may be increased from four to eight by adding a second slot 6' in the end of the bolt as illustrated in Fig. 3. The number of permissible positions for the locking finger in respect of the position of the bolt multiplied by the number of notches, assuming this number to be an odd number and prime to the number of slots in the bolt, will give the number of possible positions at which the nut may be locked during a complete rotation. In the Figure 1 construction this is forty four. In the Fig. 3 construction it is eighty eight.

For additional security it is sometimes desirable to have a locked finger at each end of the body portion of the locking member. It will be seen that the locking finger 11 is offset unsymmetrically to the offsetting of the finger 10. The center line $c$ of this finger 11 is shown at a greater angle from the center line $a$ of the body portion, than is the center line $b$ of the finger 10, in the present illustration three times. The difference in these angles is controlled by the number of the notches 9 in the nut. By suitably selecting these angles when the finger 10 is located in any slot, the finger 11 will be located in a slot at the other side of the nut.

In some instances a slight amount of movement of the nut is unobjectionable, it being more important that the locking device find lodgment rapidly. To accommodate such conditions, one of the side faces of the notches may be disposed angularly to the other, giving the locking bolt a certain amount of clearance in each notch, thereby making all positions locking positions. Clearance afforded by this expedient is shown in Fig. 3, and indicated by the reference character 15.

Certain changes in the details of construction may, of course, be made within the scope of the claims without departing from the spirit of my invention.

I claim as my invention:

1. In a nut lock, the combination with a threaded bolt having at its end a transverse slot, of a castellated nut, and a locking member comprising a body portion adapted to seat in the slot in the bolt and a finger adapted to seat in the notches of the nut, the finger of the locking member being disposed at an angle to the body portion thereof, whereby, upon reversal of the position of the said body in the slot the finger assumes different angular positions.

2. In a nut lock, the combination with a threaded bolt having at its end a transverse slot, of a castellated nut having an odd number of notches, and a locking member comprising a body portion adapted to seat in the slot in the bolt and a finger adapted to seat in the notches of the nut, the finger of the locking member being disposed at an angle to the body portion thereof different from the angular distance between centers of the notches, the position of the said body portion in the slot being capable of a reversal.

3. In a nut lock, the combination with a threaded bolt having at its end a plurality of transverse slots, of a castellated nut, the number of its notches being indivisible by the number of slots in the bolt, and a locking member comprising a body portion adapted to seat in the slot in the bolt and a finger adapted to seat in the notches of the nut, the finger of the locking member being disposed at an angle to the body portion thereof, the position of the said body portion in the said slot being capable of reversal end for end and face for face.

4. In a nut lock, the combination with a threaded bolt having at its end a plurality of transverse slots, of a nut having a number of notches prime to the number of the said slots, and a locking member comprising a body portion adapted for seating in the slot in the bolt and a pair of differently offset fingers adapted to seat in the notches of the nut.

5. In a nut lock, the combination with a threaded bolt having at its end a plurality of transverse slots, of a nut having a number of notches prime to the number of the said slots, and a locking member comprising a body portion adapted for seating in the slot in the bolt and a pair of differently offset fingers adapted to seat in the notches of the nut one of the side faces of each notch being disposed angularly to the other, whereby the nut may have a limited movement in relation to the finger.

6. In a nut lock, the combination with a threaded bolt having at its end a transverse slot, of a castellated nut, the number of its notches being a prime number, and a locking member comprising a body portion adapted to seat in the slot in the bolt and a finger adapted to seat in the notches of the nut, the finger of the locking member being disposed at an angle to the body portion thereof different from the angular distances between centers of the notches, whereby upon reversal end for end or face for face of the position of the said body in the slot the finger assumes different angular positions requiring different positions of the nut for permitting the finger to sink into a notch thereof.

In testimony whereof, I have affixed my signature hereto.

NILS ARVID PALMGREN.